(12) United States Patent
Wanis et al.

(10) Patent No.: US 11,333,757 B2
(45) Date of Patent: May 17, 2022

(54) ACOUSTIC PHASED ARRAY WITH REDUCED BEAM ANGLE

(71) Applicant: Teledyne Instruments, Inc., Thousand Oaks, CA (US)

(72) Inventors: Paul Wanis, San Diego, CA (US); Jerker Taudien, Burlington, VT (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 456 days.

(21) Appl. No.: 16/261,062

(22) Filed: Jan. 29, 2019

(65) Prior Publication Data

US 2019/0242994 A1 Aug. 8, 2019

Related U.S. Application Data

(60) Provisional application No. 62/625,891, filed on Feb. 2, 2018.

(51) Int. Cl.
  *G01S 15/60* (2006.01)
  *G10K 11/34* (2006.01)
  *G01S 15/89* (2006.01)

(52) U.S. Cl.
  CPC .............. *G01S 15/60* (2013.01); *G01S 15/89* (2013.01); *G10K 11/341* (2013.01)

(58) Field of Classification Search
  None
  See application file for complete search history.

(56) References Cited

U.S. PATENT DOCUMENTS

| | | | |
|---|---|---|---|
| 3,412,401 A * | 11/1968 | Keller | G01S 3/8083 |
| | | | 342/94 |
| 4,641,291 A | 2/1987 | Simmons et al. | |
| 5,093,747 A * | 3/1992 | Dorschner | G02F 1/292 |
| | | | 359/315 |

(Continued)

FOREIGN PATENT DOCUMENTS

| CN | 102073049 A | 5/2011 |
|---|---|---|
| CN | 101458331 B | 9/2011 |

(Continued)

OTHER PUBLICATIONS

Great Britain search report dated Jul. 30, 2019 in patent application No. GB1901344.0, 4 pp.

(Continued)

*Primary Examiner* — Hovhannes Baghdasaryan
(74) *Attorney, Agent, or Firm* — Knobbe, Martens, Olson & Bear, LLP

(57) ABSTRACT

An acoustic transducer and method of generating acoustic transmit and receive beams is disclosed. The system includes a plurality of transducer elements arranged to form an array, where the elements are electrically connected into groups which operate at the same electrical phase, where the phases of adjacent groups of elements differ by between about 50 and 70 degrees and a beamforming circuit where the transmit and receive signals are operated with appropriate phase shifts to maintain the between about 50 and 70 degrees phase difference between adjacent groups. The resulting transducer generates transmit and receive beams that are nominally inclined less than about 30 degrees from a planar normal axis of the array.

21 Claims, 13 Drawing Sheets

(56) References Cited

U.S. PATENT DOCUMENTS

| | | | |
|---|---|---|---|
| 5,550,792 A | 8/1996 | Crandall et al. | |
| 5,694,372 A | 12/1997 | Perennes | |
| 5,808,967 A | 9/1998 | Yu et al. | |
| 6,456,419 B1 * | 9/2002 | Winker | G02B 27/0087 250/227.17 |
| 7,322,936 B2 * | 1/2008 | Takeuchi | G01S 7/52046 128/916 |
| 7,420,875 B1 | 9/2008 | Hendricks | |
| 7,768,874 B2 | 8/2010 | Strong et al. | |
| 2008/0080313 A1 * | 4/2008 | Brumley | G01S 15/58 367/89 |
| 2008/0080314 A1 | 4/2008 | Brumley et al. | |
| 2008/0080315 A1 | 4/2008 | Vogt et al. | |
| 2008/0308343 A1 * | 12/2008 | Vogt | G10K 11/346 181/142 |
| 2010/0142324 A1 * | 6/2010 | Vogt | G01P 5/241 367/88 |

FOREIGN PATENT DOCUMENTS

| | | | | |
|---|---|---|---|---|
| CN | 101509971 B | 9/2011 | | |
| CN | 203116736 U | 8/2013 | | |
| CN | 102590804 B | 1/2014 | | |
| CN | 106908086 A | 6/2017 | | |
| CN | 104502633 B | 4/2018 | | |
| DE | 102005031973 B3 * | 8/2006 | | G01S 15/60 |
| EP | 1 491 914 | 12/2004 | | |
| JP | 2001-197595 | 7/2001 | | |

OTHER PUBLICATIONS

Great Britain search report dated Nov. 8, 2019 in patent application No. GB1901344.0, 2 pp.
Taudien J., "Array Imbalance Analysis", dated Oct. 11, 2017, 3 pages.
Teledyne Instruments, Inc., "Pinnacle System Design Document",Rev. 0.3, dated Jan. 25, 2018, 4 pages.
Teledyne Instruments, Inc., "Array Plot—Prototype", printed Jan. 2018, 1 page.
Wanis P., "Phased Arrays—Tutorial PowerPoint", dated Jun. 28, 2017, 36 pages.
French preliminary search report dated Sep. 29, 2021 in patent application No. FR1901022.
Great Britain Examination Report dated Jan. 27, 2022 in Patent Application No. GB1901344.0, 3 pp.

* cited by examiner

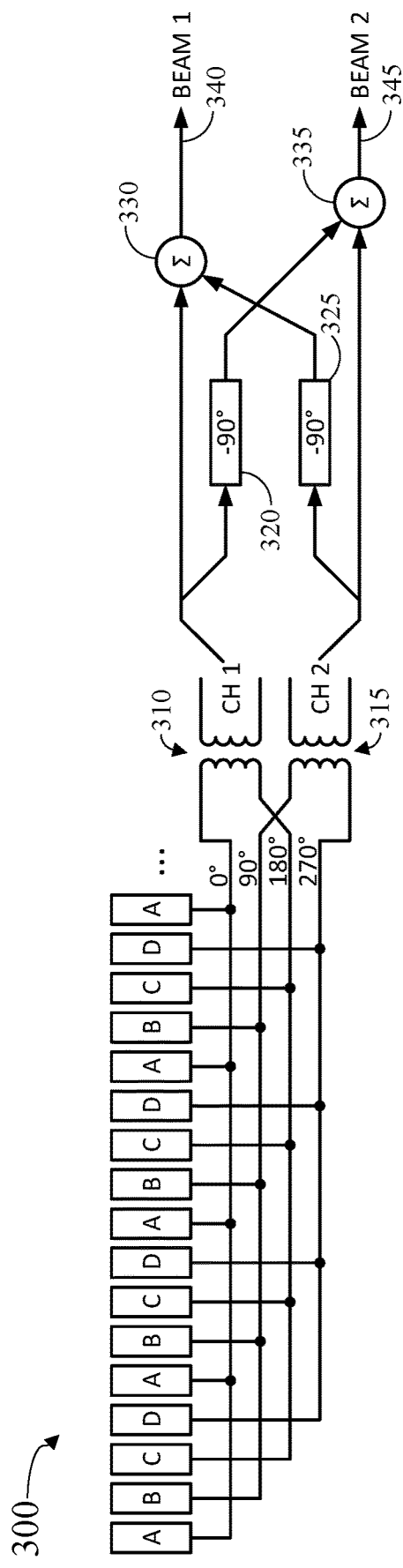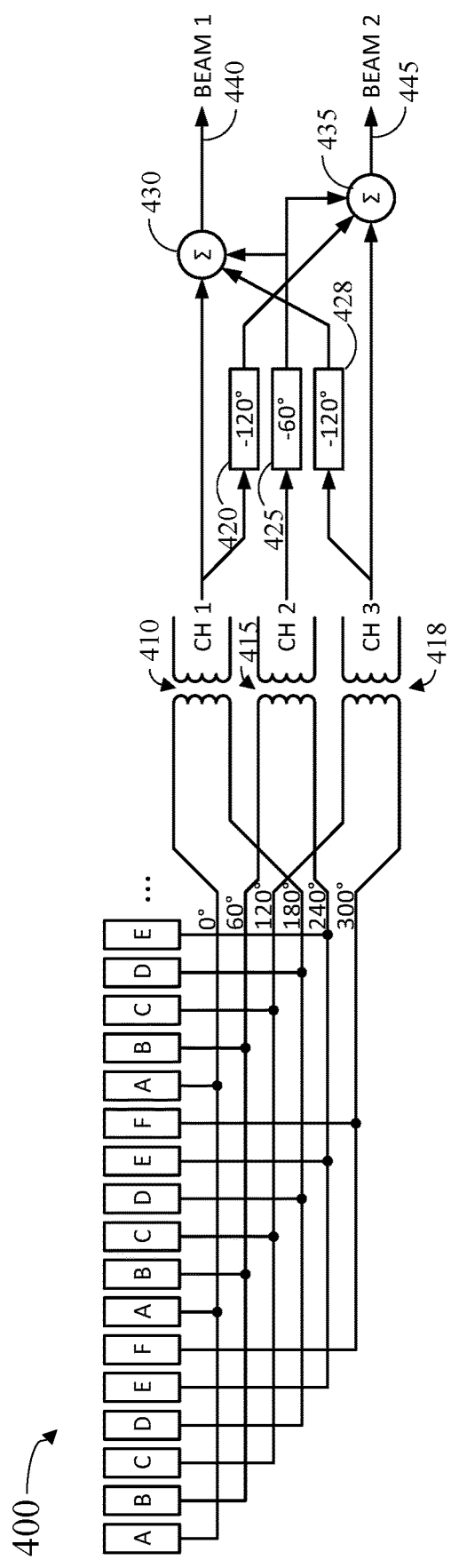
FIG. 3 (Prior Art)
FIG. 4

ACOUSTIC PHASED ARRAY WITH REDUCED BEAM ANGLE

RELATED APPLICATIONS

This application claims priority to U.S. Application No. 62/625,891, filed on Feb. 2, 2018, which is incorporated herein by reference in its entirety.

BACKGROUND

Field

The disclosed technology relates to underwater acoustic measurement systems and, more particularly, to a Doppler sonar system that includes a phased array transducer with a beam angle that is offset from vertical.

Description of the Related Technology

Transducers which simultaneously generate multiple narrow acoustic beams inclined outward in two axes from a plane can be used in different types of acoustic backscatter systems that measure velocity and/or distance in two or three dimensions. Examples include Acoustic Doppler Velocity Sensors (ADVSs), Doppler Velocity Logs (DVLs), and Acoustic Doppler Current Profilers (ADCPs) which employ a simple set of four beams in a "Janus" configuration for two or three axis velocity measurement, sonars which measure distance to target in the water (such as forward scanning sonars), and bottom mapping sonars.

ADVSs are widely used for measurement of vertical profiles of water current measurements and for earth and/or water referenced velocity measurement for vessel navigation. They measure 3-axis velocities by measuring velocity along lines of position defined by narrow acoustic beams. A minimum of three beams oriented at different directions are required to measure the three orthogonal velocity components. Typically four narrow (1°-4°) conical transmit/receive beams are employed and positioned in two axes of a plane surface and inclined relative to the normal to that plane. This configuration, well known in the field of high precision acoustic instrumentation, is referred to as a Janus configuration; the two sets of narrow conical beams are symmetrically inclined outward and positioned at four 90° circumferential increments on the surface of a larger (typically 60°) outward opening cone.

SUMMARY OF CERTAIN INVENTIVE ASPECTS

The system and method of the technology each have several aspects, no single one of which is solely responsible for its desirable attributes. Without limiting the scope of this invention, some aspects will now be briefly discussed.

The disclosed technology includes a phased array acoustic transducer which can produce acoustic beams with a beam angle that in a nominal embodiment is 20 degrees from vertical, versus the 30 degrees available in the existing technology. In the disclosed technology, as in existing technology, the array is constructed of elements which have a nominal spacing of one-half wavelength of the acoustic signal. However, the disclosed technology is distinguished from existing technology by the electrical phasing of the transducer elements. Whereas in the existing technology the elements are grouped into staves which are separated in phase by 90 degrees (a total of four distinct phases), in the disclosed technology the elements are grouped into staves which are separated in phase by 60 degrees, for a total of six distinct phases.

In one aspect, there is an acoustic transducer, comprising a plurality of transducer elements arranged to form an array, wherein the elements are electrically connected into groups which operate at the same electrical phase, wherein the phases of adjacent groups of elements differ by between about 50 and 70 degrees; and a beamforming circuit wherein the transmit and receive signals are operated with appropriate phase shifts to maintain the between about 50 and 70 degrees phase difference between adjacent groups; wherein the resulting transducer generates transmit and receive beams that are nominally inclined less than about 30 degrees from a planar normal axis of the array.

The acoustic beams formed by the system may be in a Janus configuration. The transducer elements may be arranged to form a single two-dimensional array, wherein the elements may be electrically connected into rows in a first dimension and columns in a second dimension and the rows may be electrically independent of the columns, and beamforming may be applied to generate a total of four acoustic beams. The transducer elements may be arranged to substantially form a pattern selected from the group consisting of circular, elliptical and polygonal shapes. The transducer may be used to measure the relative velocity between the transducer and acoustic scatterers in water. The dimension of the array elements may be about 0.50 wavelength at a nominal speed of sound in the vicinity of the transducer. The elevation angle may be nominally 20 degrees. The relative phase shifts or time delays may correspond to a value of about 60 degrees. The dimension of elements of the array may be about 0.49 wavelength at a nominal speed of sound, but can be varied from about 0.34 wavelength to 0.60 wavelength.

In another aspect, there is an acoustic transducer, comprising a plurality of transducer elements of dimension between about 0.34 and 0.60 wavelength at a nominal speed of sound, arranged to substantially form a pattern selected from the group consisting of circular, elliptical, or polygonal shapes; a first side of the transducer consisting of connections that connect rows of array elements together to form six groups, wherein each group is staggered by one row and is connected to every sixth row of the first side; and a second side of the transducer consisting of connections that connect columns of array elements together to form six groups, wherein each group is staggered by one column and is connected to every sixth column of the first side.

The transducer elements may be arranged to substantially form a circular pattern. The transducer may be used to measure the relative velocity between the transducer and acoustic scatterers in water. Transmit and receive beams may be formed by applying phase shifts or time delays to the groups of signals. The elevation angle may be nominally 20 degrees. The relative phase shifts or time delays may correspond to a value of about 60 degrees. The dimension of elements of the array may be about 0.49 wavelength at a nominal speed of sound.

In another aspect, there is a method of generating four acoustic transmit and receive beams in a Janus configuration with an elevation angle less than about 30 degrees from an axis normal to an acoustic phased-array transducer, the method comprising configuring an array of the transducer in a transmit mode; forming the transmit beams by generating waveforms of appropriate relative phase relationship on six groups of array row connections and six groups of array column connections; configuring the array in a receive mode; applying relative phase shifts or time delays corresponding to a value between about 50 and 70 degrees to either six column connections or six row connections; and summing the signals for which the phase shifts were applied to form the four receive beams.

Relative velocity between the transducer and acoustic scatterers in water or boundary including but not limited to sea bottom, ice sheets, or surface may be measured. The dimension of elements of the array may be about 0.50 wavelength at a nominal speed of sound. Elements of the transducer may be arranged to substantially form a pattern selected from the group consisting of circular, elliptical and polygonal shapes. The elevation angle may be nominally 20 degrees. The relative phase shifts or time delays may correspond to a value of about 60 degrees. The dimension of elements of the array may be about 0.49 wavelength at a nominal speed of sound, but can be varied from about 0.34 wavelength to 0.60 wavelength.

In yet another aspect, there is a system for generating four acoustic transmit and receive beams in a Janus configuration with an elevation angle less than about 30 degrees from an axis normal to an acoustic phased-array transducer, the system comprising means for configuring an array of the transducer in a transmit mode; means for forming the transmit beams by generating waveforms of appropriate relative phase relationship on six groups of array row connections and six groups of array column connections; means for configuring the array in a receive mode; means for applying relative phase shifts or time delays corresponding to a value between about 50 and 70 degrees to either six column connections or six row connections; and means for summing the signals for which the phase shifts were applied to form the four receive beams.

The dimension of elements of the array may be about 0.50 wavelength at a nominal speed of sound. Elements of the transducer may be arranged to substantially form a pattern selected from the group consisting of circular, elliptical and polygonal shapes. The elevation angle may be nominally 20 degrees. The relative phase shifts or time delays may correspond to a value of about 60 degrees. The dimension of elements of the array may be about 0.49 wavelength at a nominal speed of sound, but can be varied from about 0.34 wavelength to 0.60 wavelength.

BRIEF DESCRIPTION OF THE DRAWINGS

FIG. 3 is a diagram illustrating the method for receiving and beam-forming a symmetric pair of acoustic beams, angled at 30 degrees from vertical, as implemented in the existing technological applications.

FIG. 4 is a diagram illustrating a method for receiving and beam-forming a symmetric pair of acoustic beams, angled at about 20 degrees from vertical, as implemented in an embodiment of the disclosed technology.

DETAILED DESCRIPTION OF CERTAIN ILLUSTRATIVE EMBODIMENTS

Figure 1:
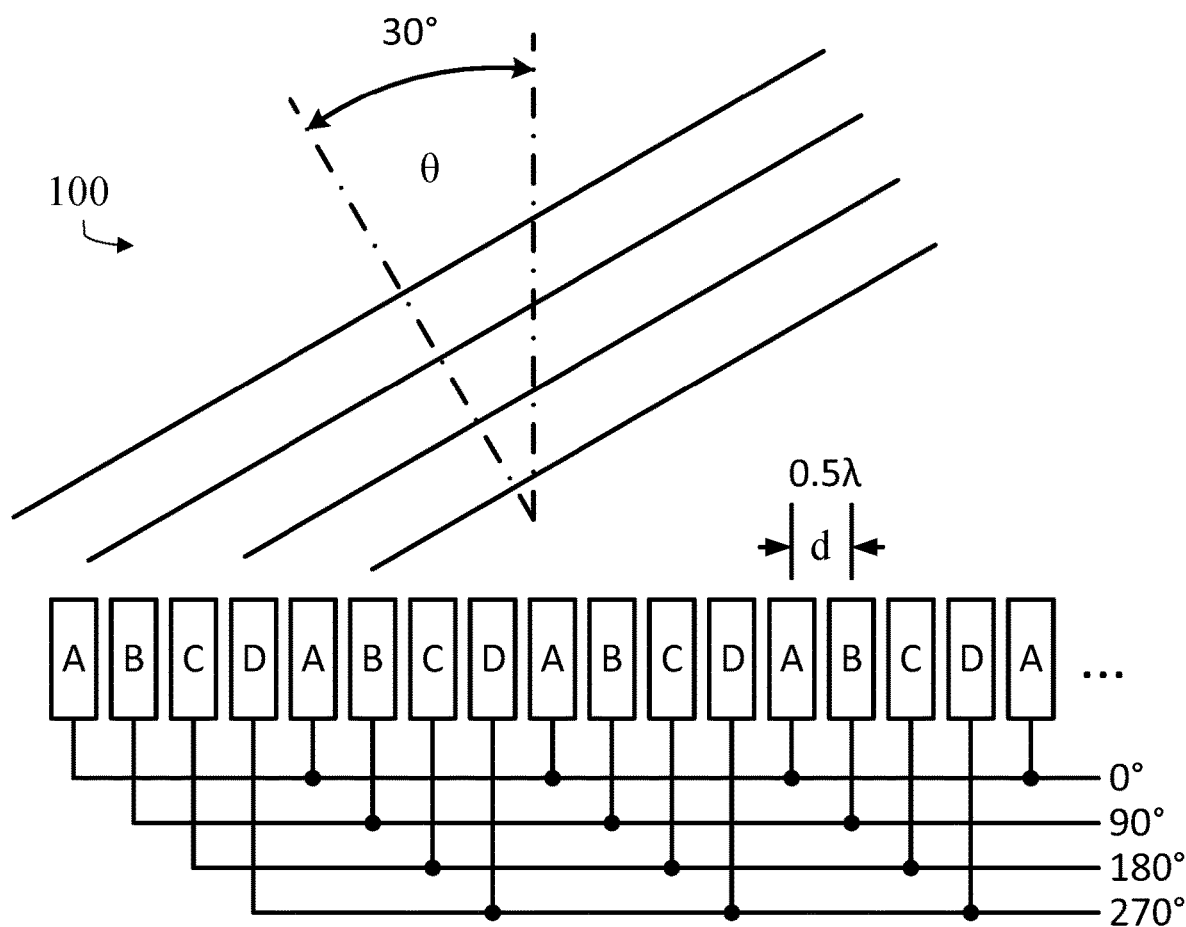
FIG. 1 is a diagram illustrating the relative element spacing and phasing for the transmission or reception of a single acoustic beam, angled at 30 degrees from vertical, as implemented in the existing technological applications.

Currently available transducer technology used to produce a four beam configuration include assemblies of 4-piston transducers or a two-dimensional circular phased array transducer (see '967 patent below which discloses the latter system).

In the existing technology, both one-dimensional and two-dimensional phased array systems have been disclosed. U.S. Pat No. 4,641,291, entitled "Phased Array Doppler Sonar Transducer" and U.S. Pat No. 5,550,792, entitled "Sliced Phased Array Doppler Sonar System", both disclose one-dimensional phased arrays, i.e., arrays which are capable of generating a single pair of acoustic beams. U.S. Pat. No. 5,808,967, entitled "Two-Dimensional Array Transducer and Beamformer", discloses a two-dimensional phased array, i.e., an array which is capable of generating two orthogonal pairs of acoustic beams. Each of these patents is incorporated by reference in their entirety. In the existing technology, the beam angle, which is by convention measured as the angle of inclination of the beam relative to the normal of the plane of the transducer array, is nominally 30 degrees. This beam angle is a direct result of the design of the transducer, specifically the spacing between elements of the transducer array, the connectivity between array elements and the electrical wires, and the relative phase of the signals on the elements of the array.

In typical ADCP and DVL applications, the phased array technology offers significant benefits. The principal benefit of phased array technology is reduced size: for a given Janus configuration a phased array transducer requires approximately one-fourth the total area of an equivalent transducer array constructed from Piston transducers. The phased array also offers reduced disturbance of the local flow of water, since the array has a planar transducer face (versus the inclined transducers required for the piston configuration). Additionally, when measuring velocities which are parallel to the transducer face, the phased array technology is largely immune to local variations in the speed of sound.

For many applications of ADCP and DVL technology, it is advantageous to have a beam angle that is less than the aforementioned 30 degrees. A configuration with beam angles less than 30 degrees (i.e., with the set of beams closer to the normal of the plane of the array) offers many advantages, including:

- a longer possible profiling range, since the profiling range is limited by the absolute range (slant range) of the beam, and with a smaller beam angle a greater proportion of the slant range contributes to the overall profiling range,
- less opportunity for the acoustic signal to strike extraneous physical obstructions in the environment,
- lower opportunity for spatial aliasing of velocity information e.g., due to short-wavelength ocean waves, and
- a smaller "sidelobe rejection region", e.g., the portion of the profile which becomes contaminated due to the acoustic reflection from a nearby boundary such as the sea surface or sea bed.

It is understood that the beam angle of the phased array can be adjusted by varying the spacing between transducer elements. However, when the spacing between transducer elements exceeds 0.50 wavelength, the beam pattern begins to degrade and form artifacts known as grating lobes. In applications of instrument use where a small amount of degradation is tolerable, an element spacing as wide as 0.60 wavelength may still be useful, but element spacing wider than 0.60 wavelength results in a beam pattern that is unacceptable for most applications. For this reason it is believed that existing technology cannot be used to generate a 20 degree beam angle, since the spacing of the elements would need to be about 0.73 wavelength, which would introduce significant grating lobe artifacts into the beam pattern. Therefore, a new approach is needed to feasibly create a 20 degree beam angle from a phased array in an efficient manner.

Figure 12:
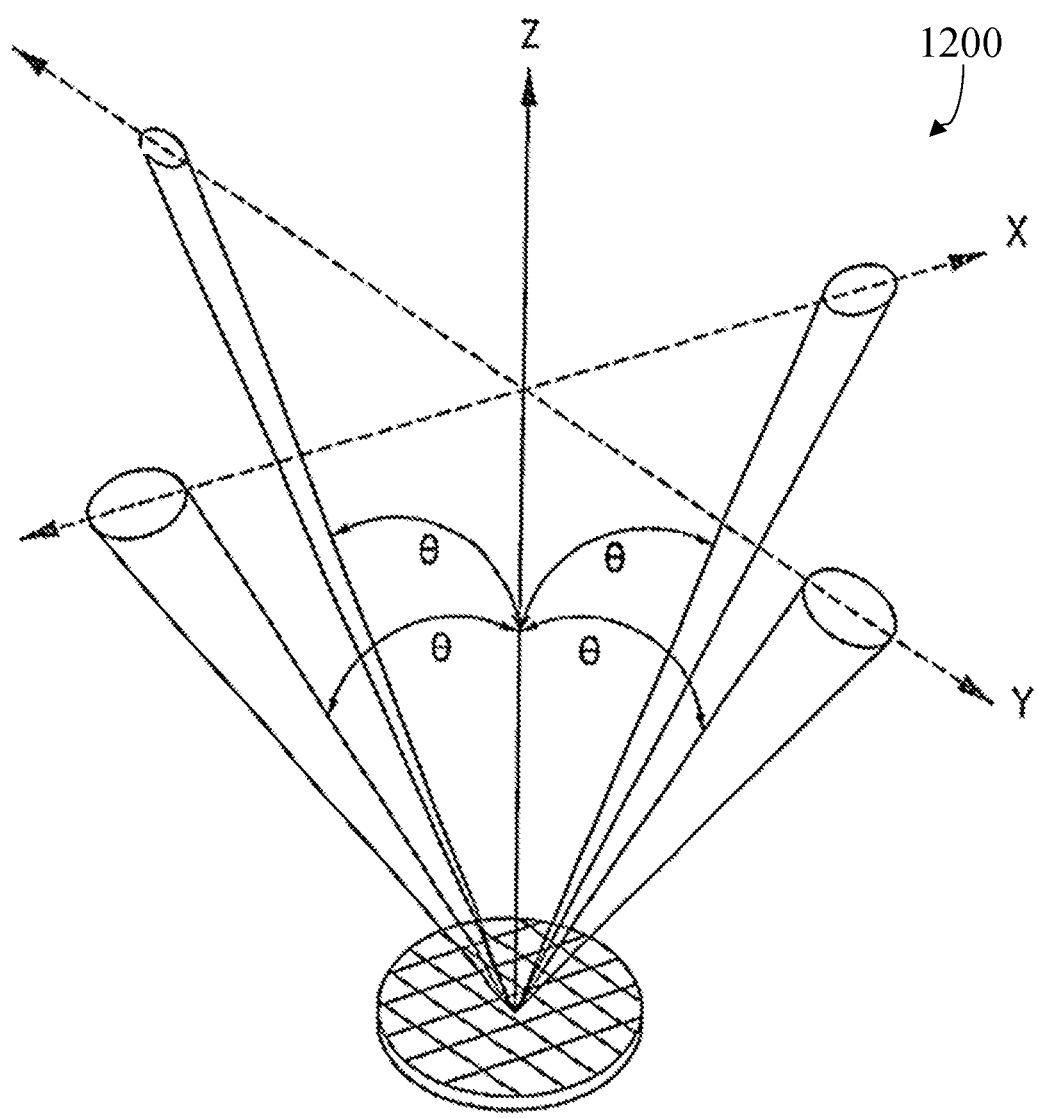
FIG. 12 is a diagram illustrating an example of a Janus configuration of acoustic beams.

The disclosed technology addresses the need for a phased array acoustic transducer which provides a Janus configuration of acoustic beams at a beam angle significantly less than the existing technology, while still providing the aforementioned benefits of phased array technology. An example of a Janus configuration of acoustic beams 1200 at a beam angle θ is shown in FIG. 12.

In a phased array transducer, the mathematical relationship between the element spacing, the electrical phasing between adjacent elements, and the resultant beam angle is:

$$d \sin \theta = \frac{\Delta \varphi}{360°} \lambda, \qquad (1)$$

where d is the distance between adjacent elements, θ is the beam angle (inclination from the plane normal of the array), Δφ is the phase difference between adjacent staves, and λ is the wavelength of the acoustic frequency being transmitted or received by the array.

Figure 13:
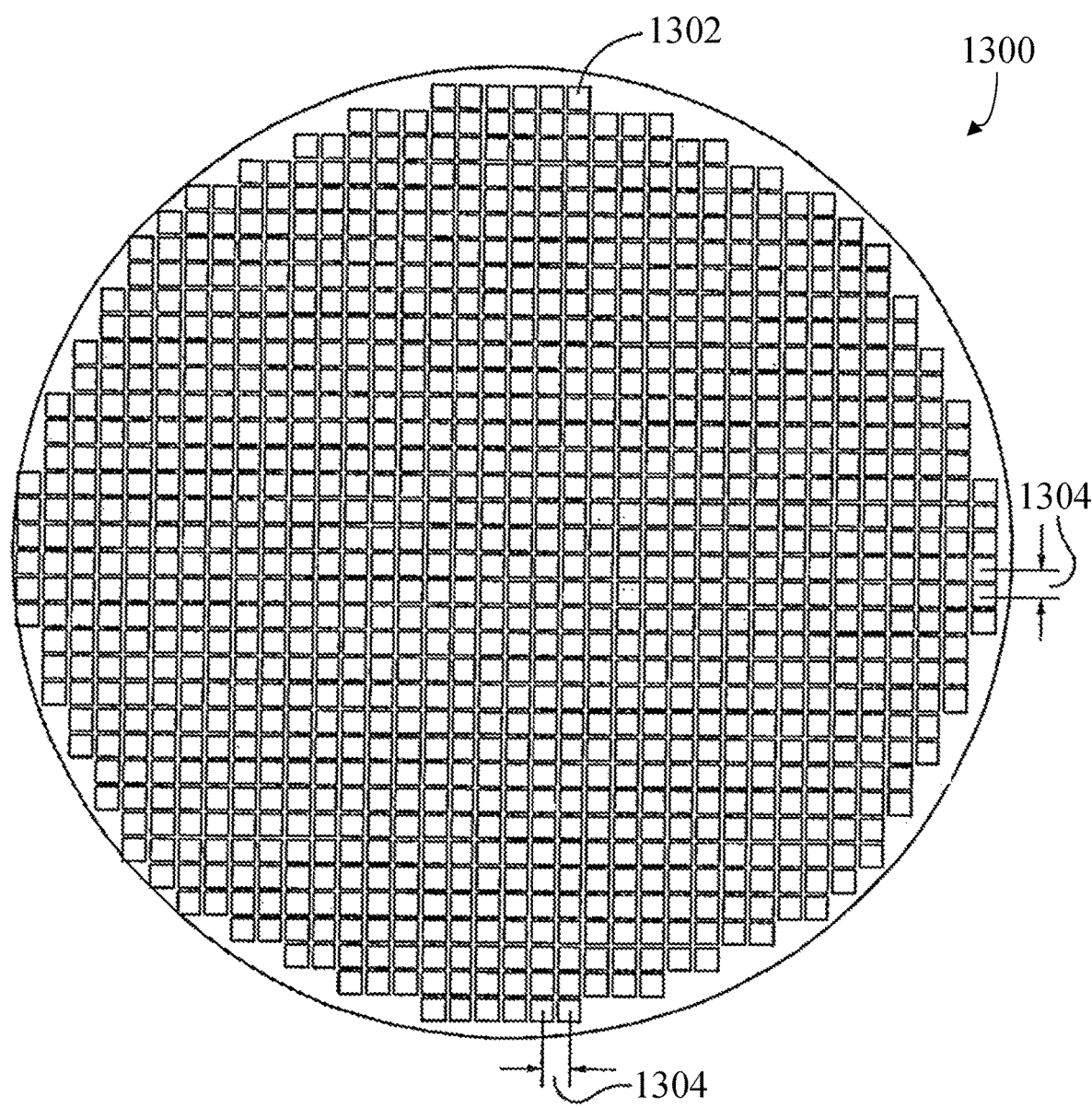
FIG. 13 is a diagram illustrating a top view of an example transducer array.

A top view of an example transducer array 1300 is provided in FIG. 13. Adjacent array elements 1302 are spaced apart at a distance d 1304. Although the transducer array 1300 is shown in the shape of a circle in some embodiments, the transducer elements can be arranged to substantially form a pattern of an elliptical or a polygonal shape in other embodiments.

In an implementation 100 indicative of existing technology, as illustrated in FIG. 1, a phased array transducer has groupings of elements in four distinct phases A, B, C and D. The inter-element distance d is one-half the signal wavelength λ, and the inter-element phasing Δφ is set to 90 degrees (so the phase repeats after every four elements). This results in a beam angle θ of 30 degrees. It should be noted that the wavelength is dependent on the speed of sound in the water at the face of the transducer according to $$\lambda = \frac{c}{f}, \qquad (2)$$

where c is the speed of sound and f is the acoustic frequency. Therefore, variation of the sound speed from a nominal sound speed $c_0$ results in a small variation of the wavelength and also a small variation of the beam angle θ.

Using an implementation 300 indicative of existing technology, the beams are formed in the receive direction as shown in FIG. 3. Specifically, the signals from the four stave groups are combined into two receive channels via transformers 310 and 315, where the two sides of the transformer are connected to stave groups that are separated in phase by 180 degrees. The two beams are then formed via phase shift and addition of signals. The first beam 340 is formed by shifting 325 Channel 2 by −90° and adding 330 to Channel 1, and the second beam 345 is formed by shifting 320 Channel 1 by −90° and adding 335 to Channel 2. As described in the '967 patent, a second orthogonal pair of receive beams can be formed by applying the same technique to a second set of staves which are wired orthogonal to the first set.

Figure 5:
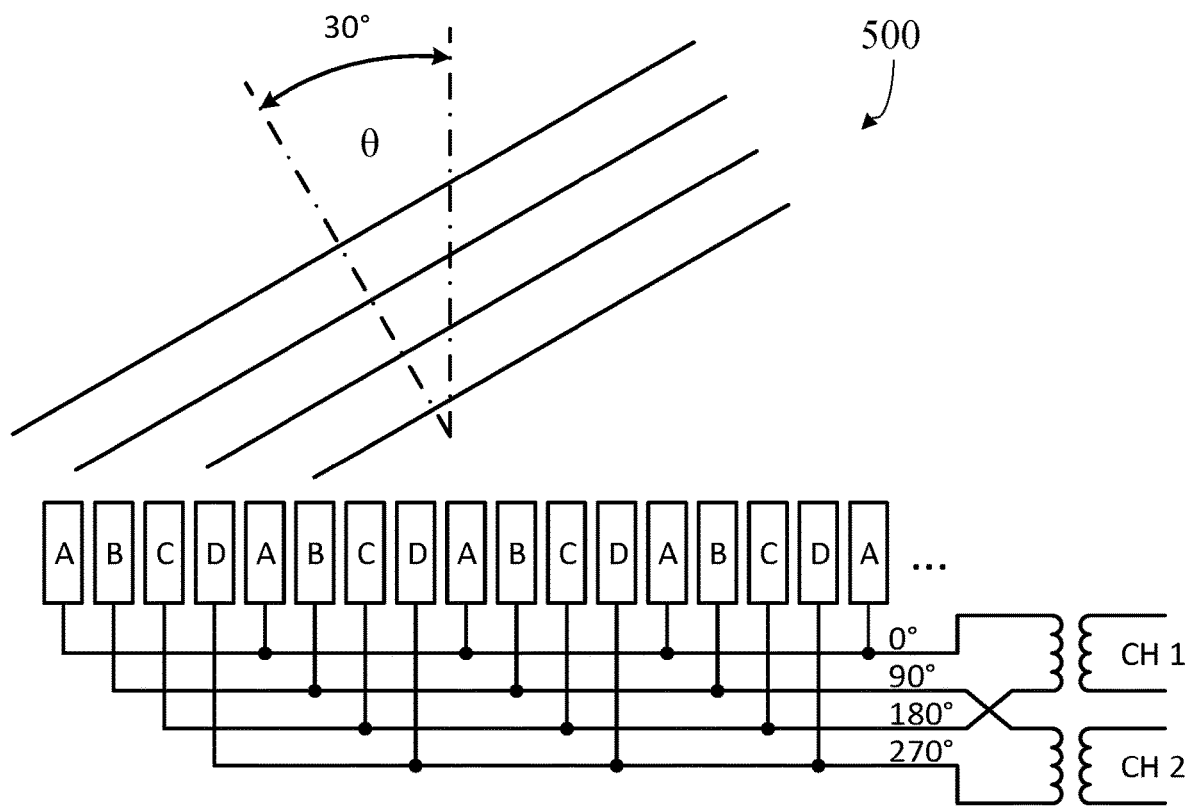
FIG. 5 is a diagram illustrating the method for transmitting a single acoustic beam, angled at 30 degrees from vertical, as implemented in the existing technological applications.
Figure 7:
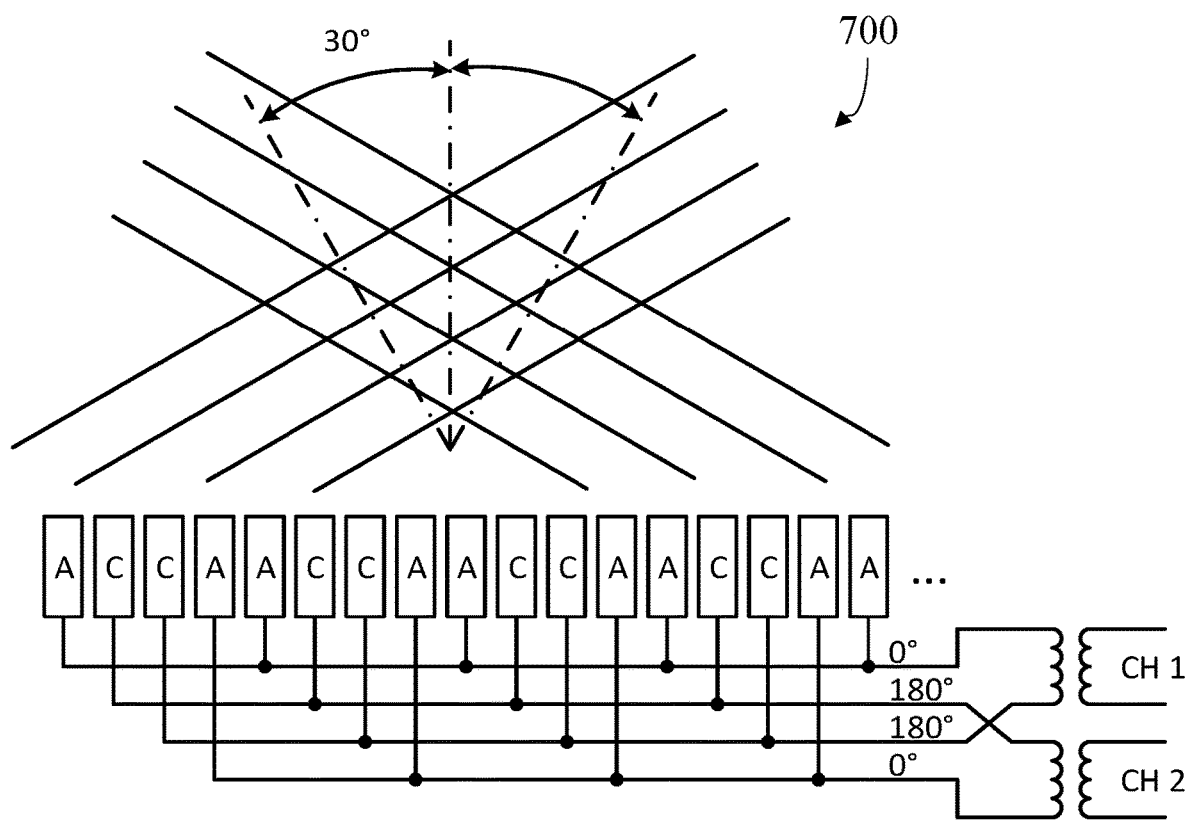
FIG. 7 is a diagram illustrating the method for transmitting a symmetric pair of acoustic beams, angled at 30 degrees from vertical, as implemented in the existing technological applications.

By the principle of reciprocity, acoustic beams can be transmitted from the phased array in a manner that is analogous to the receiving described in the preceding paragraph, as shown for existing technology in FIG. 5 and FIG. 7. As shown in the two figures, transformers are again used to combine the four stave groups into two channels. As shown in FIG. 5, in an implementation 500 indicative of existing technology, a single beam can be transmitted by driving Channel 1 with the desired transmit waveform, and driving Channel 2 with the same transmit waveform with its phase delayed by 90 degrees. The opposite acoustic beam can be transmitted by reversing the phase relationship, e.g., by delaying the phase of the signal on Channel 1 by 90 degrees relative to Channel 2.

It is often desired to simultaneously transmit a pair of acoustic beams from the same array. This is accomplished by driving the staves with the linear superposition of signals required for the individual beams. It should be understood and appreciated that a uniform scaling and phase shift can be applied to all the signals and yield the same transmit beam characteristic. In an implementation 700 indicative of existing technology, the simultaneous transmission of a beam pair is accomplished, as shown in FIG. 7, by driving Channel 1 and Channel 2 with the same signal, but 180 degrees out of phase. It should be noted that driving Channel 1 and Channel 2 with an in-phase signal will yield the same result, and it should also be noted and appreciated that any scheme which creates a set of signals with 180 degree phase reversals at a distance of one wavelength will yield a symmetric pair of beams.

Similar to the preceding discussion of receive beamforming, this transmit beam-forming can be applied to two orthogonal pairs of beams, as described in the '967 patent, by applying the same technique to a second set of staves which are wired orthogonal to the first set.

Figure 2:
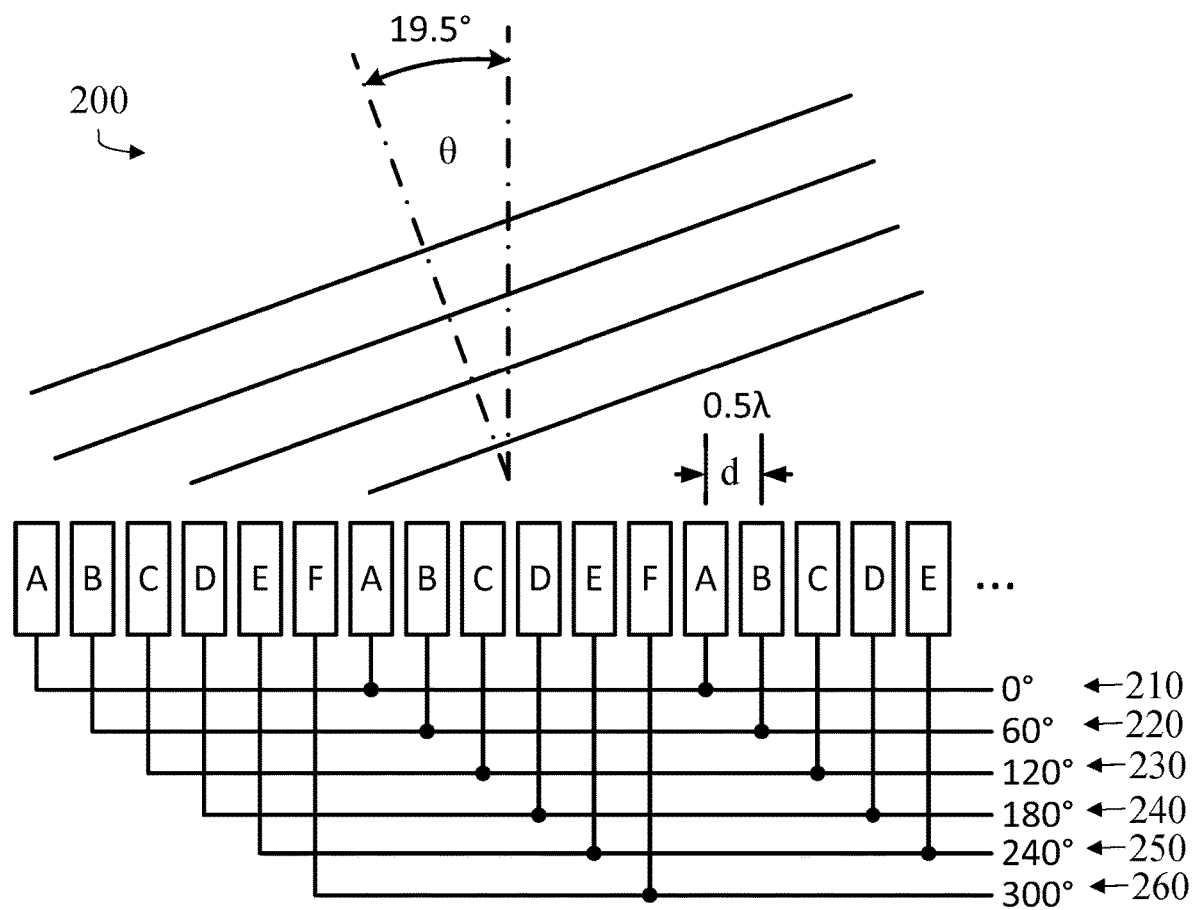
FIG. 2 is a diagram illustrating a relative element spacing and phasing for the transmission or reception of a single acoustic beam, angled at about 20 degrees from vertical, as implemented in an embodiment of the disclosed technology.

The element spacing and phasing 200 employed in the disclosed technology is shown in FIG. 2. In certain embodiments, as shown in the figure, a phased array transducer has groupings of elements in six distinct phases A (210), B (220), C (230), D (240), E (250) and F (260). In certain embodiments, the inter-element distance d is one-half the signal wavelength λ as before. However the inter-element phasing Δφ is set to 60 degrees (so the phase repeats after every six elements).

Figure 14:
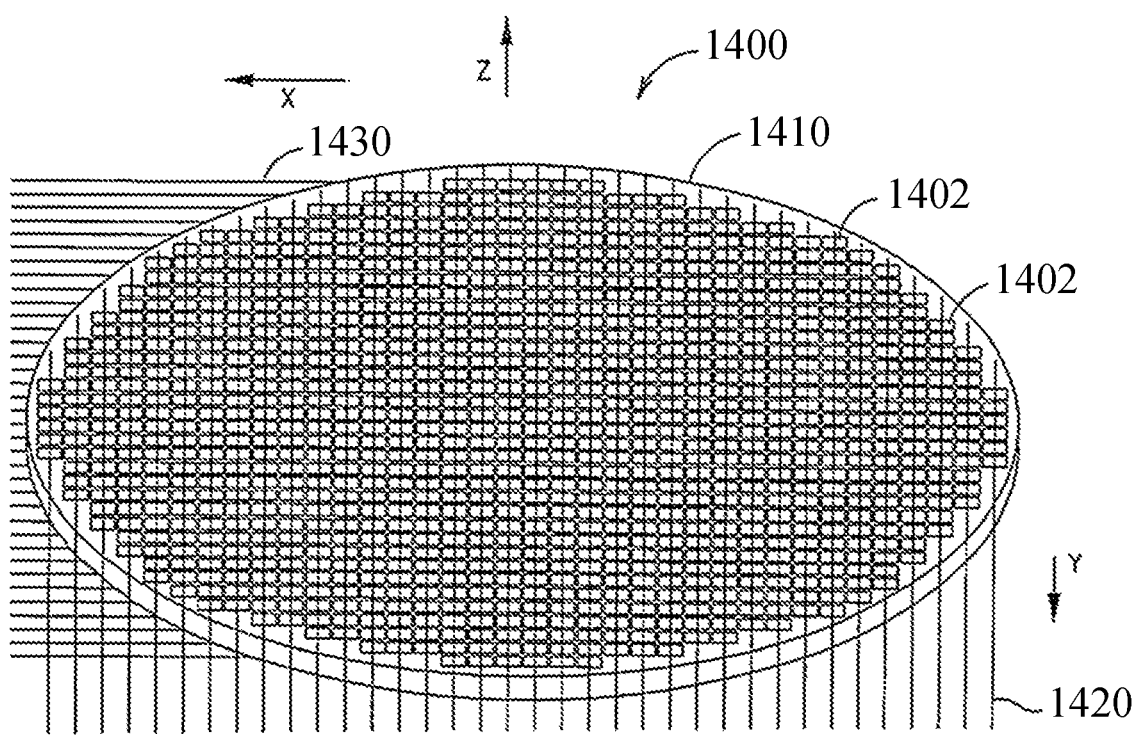
FIG. 14 is a diagram illustrating an example transducer array with interconnections of row elements and of column elements.

Referring to FIG. 14, an example of a phased array transducer 1400 is shown. In certain embodiments, individual array elements 1402 are electrically interconnected along front-side columns 1420 and back-side rows 1430. The coordinate system used for the purposes of this description is as shown with the rows 1430 oriented in the X axis, columns 1420 in the Y axis, and the Z axis normal to the plane face 1410. The groupings of elements in six distinct phases A, B, C, D, E and F can correspond to six consecutive columns or six consecutive rows of the array.

Returning to the discussion of FIG. 2, in some embodiments, the inter-element phasing can be about 60 degrees in value, such as 60 degrees, between sixty +/−0.1 degrees, sixty +/−1 degrees or sixty +/−10 degrees, where the principal limitation on the phasing is the amount of degradation that can be tolerated in the resultant beam pattern. In some embodiments, the inter-element phasing Δφ set to 60 degrees and inter-element distance d set to 0.50 wavelength results in a beam angle θ of 19.5 degrees. In some embodiments, the beam angle can be less than 30 degrees, such as 20 degrees, between 16.0 and 20.0 degrees, and between 20.0 and 30.0 degrees. Alternatively the inter-element distance d could be 0.490 times the signal wavelength λ. In some embodiments, the inter-element distance d can be 0.50 (one half) wavelength in value, between 0.34 and 0.50 wavelength, or between 0.50 and 0.60 wavelength, where the only limitation on the smaller dimension is the practicality of building the array. The limitation of the greater dimension is degradation of the beam pattern due to grating lobes. With the inter-element phasing Δφ of 60 degrees and the inter-element distance d of 0.49, the resultant beam angle θ would be 20 degrees.

The receive beamforming architecture of the disclosed technology is shown in FIG. 4. As shown in the figure, the disclosed technology expands upon the existing technology by the addition of additional phase groups. Stave groups with a phase difference of 180 degrees are connected to opposite sides of each electrical transformer 410, 415 and 428 to generate three channels from the six stave groups A-F. One of the beams 440 is then formed by adding 430 the signals from these three channels, where the Channel 1 signal is included without any phase shift, the Channel 2 signal has had its phase shifted 425 by −60°, and the Channel 3 signal has had its phase shifted 428 by −120°. Similarly, the other beam 445 is formed by adding 435 the signals from the same three channels, but with the Channel 1 signal having its phase shifted 420 by −120°, the Channel 2 signal having its phase shifted 425 by −60°, and no phase shift in the Channel 3 signal.

Figure 6:
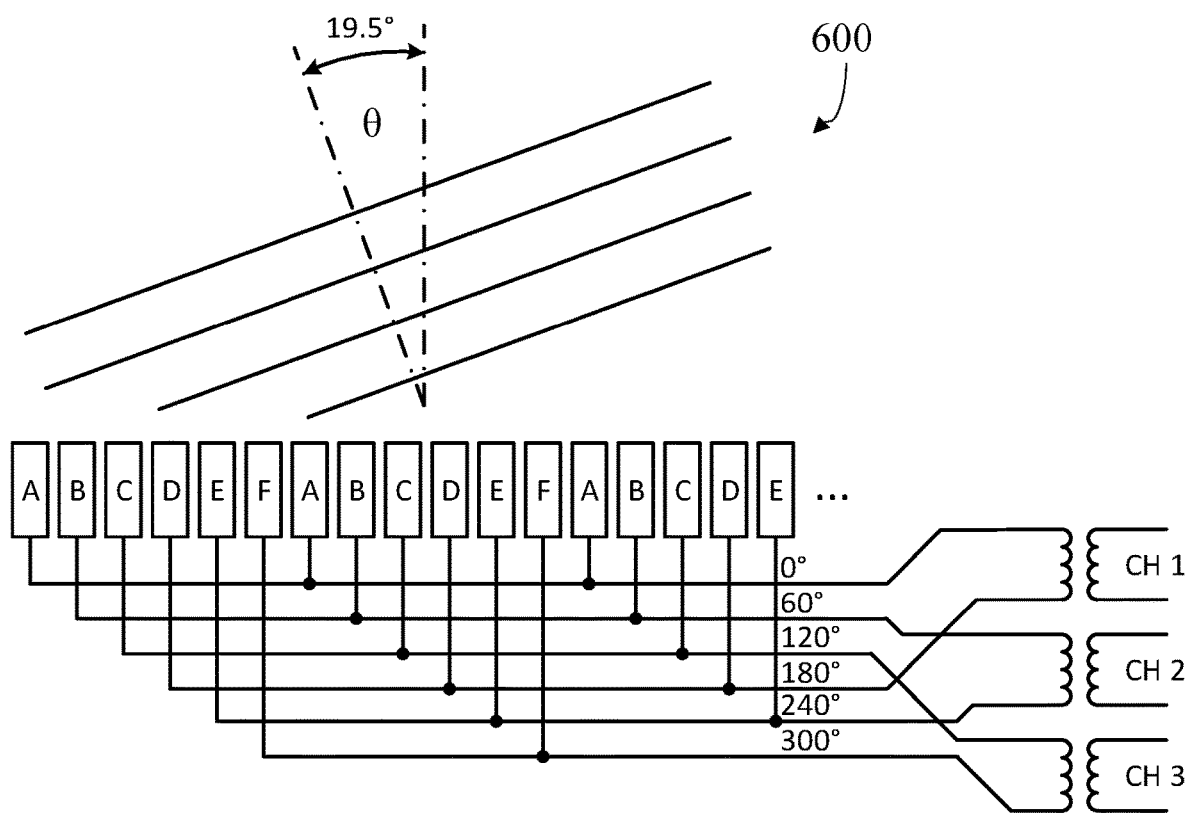
FIG. 6 is a diagram illustrating a method for transmitting a single acoustic beam, angled at about 20 degrees from vertical, as implemented in an embodiment of the disclosed technology.

The embodiment 600 shown in FIG. 6 uses transformers and phase shifters to perform receive beamforming. However, other methods exist for performing the receive-beamforming operation. Some examples include digitizing all unique channels followed by beamforming in the digital domain; use of differential amplifiers to combine the 0° and 180° pairs followed by digitization and beamforming in the digital domain; analog or digital time-delay beamforming; or any combination thereof.

As described in the '967 patent, a second orthogonal pair of receive beams can be formed by applying the same technique to a second set of staves which are wired orthogonal to the first set.

Figure 8:
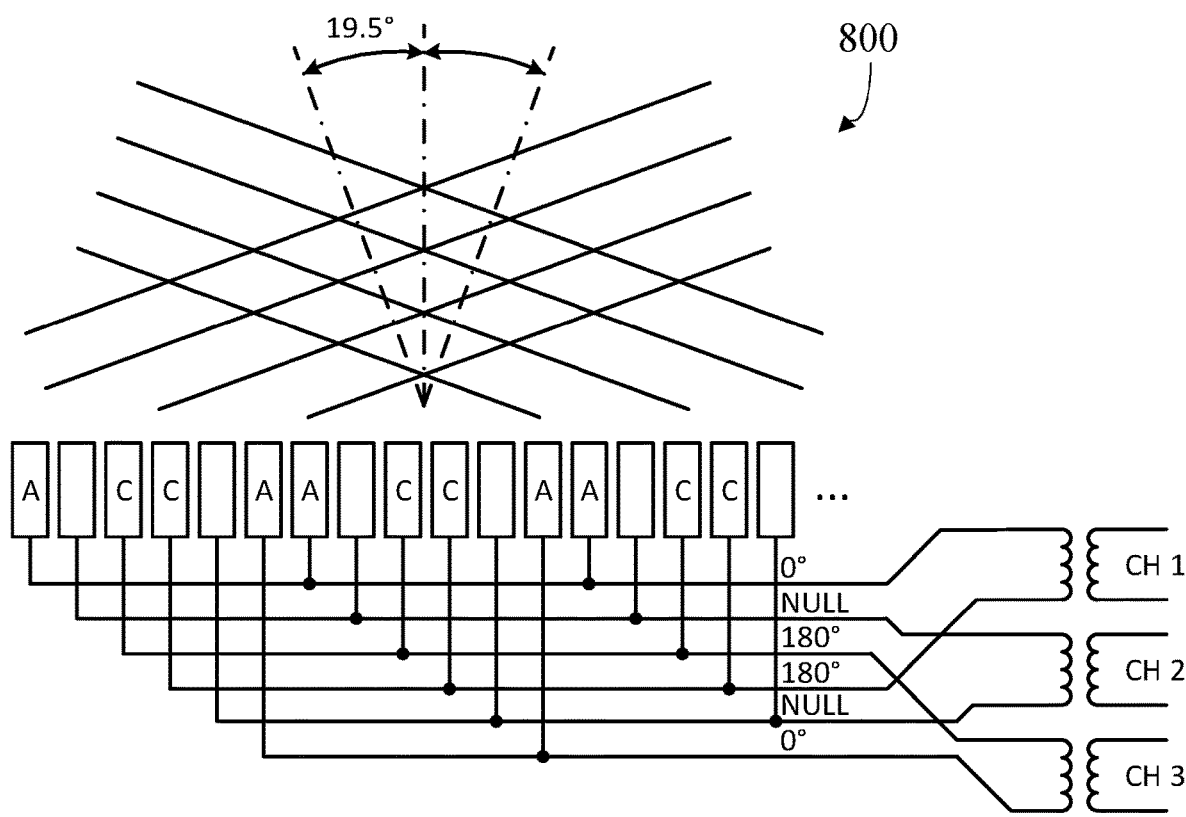
FIG. 8 is a diagram illustrating a method for transmitting a symmetric pair of acoustic beams, angled at about 20 degrees from vertical, as implemented in an embodiment of the disclosed technology.

By the principle of reciprocity, acoustic beams can be transmitted from the phased array of the disclosed technology in a manner that is analogous to the receiving described in the preceding paragraph, as shown in FIG. 6 and FIG. 8. As shown in the two figures, transformers are again used to combine the six stave groups into three channels. As shown in FIG. 6, in the disclosed technology a single beam can be transmitted by driving Channel 1 with the desired transmit waveform, driving Channel 2 with the same transmit waveform with its phase shifted by 60 degrees, and driving Channel 3 with the same transmit waveform with its phase shifted by 120 degrees. The opposite acoustic beam can be transmitted by reversing the phase relationship, e.g., by driving Channel 3 with the desired transmit waveform, driving Channel 2 with the same transmit waveform with its phase shifted by 60 degrees, and driving Channel 1 with the same transmit waveform with its phase shifted by 120 degrees.

The embodiment described in FIG. 6 and FIG. 8 uses three transformers to convert from three channels to six stave groups. However, other methods exist for driving phased-array transducers when transmitting. Some examples include direct drive of stave pairs using FETs in configurations such as half bridge, H-bridge or resonant circuit; direct linear drive with sinusoidal waveforms; or any combination thereof.

The embodiment 800 to simultaneously transmit a pair of acoustic beams from the same array using the disclosed technology is shown in FIG. 8. As before, the generation of simultaneous beams is accomplished by driving the staves with the linear superposition of signals required for the individual beams. In this embodiment the linear superposition of signals results in a repeating sequence of elements with two elements at zero degrees phase, one null (not driven) element, two elements at 180 degrees phase, then one more null (not driven) element. It should be understood and appreciated that a uniform scaling and phase shift can be applied to all the signals and yield the same transmit beam characteristic. As shown in the FIG. 8, in the disclosed technology a simultaneous pair of transmit beams is generated by driving Channel 1 with the desired transmit waveform, leaving Channel 2 un-driven (null), and driving Channel 3 with the transmit signal phase shifted by 180 degrees. It should be understood and appreciated that other transmit drive schemes will yield the same result, e.g., driving Channel 1 and Channel 2 with the desired transmit waveform (at the same phase) and leaving Channel 3 un-driven (null), and that these alternate transmit schemes also fall within the scope of the present invention. More generally, any scheme which creates a set of signals which has 180 degree phase reversals at a distance of one-and-a-half wavelengths, with a null signal centered between those two 180-degree extrema, will yield a symmetric pair of beams.

The discussion so far has focused on precise phase relationships between the three channels of the 20° phased-array transducer. The scope of the invention should not be limited to the precise phase relationships stated in this disclosure. A person skilled in existing technology would understand that it may not be possible to control the relative phases between the three channels to any arbitrary precision. Therefore, the actual relative phases between the three channels could deviate by some small amount. It is desirable to maintain the relative phases close to the nominal relative phases, as specified in FIG. 6 and FIG. 8. Deviation of the relative phases from the nominal values results in alteration of the beam patterns from the nominal patterns shown in FIG. 9, FIG. 10, and FIG. 11. The rejection ratio is defined as the power of the desired signal divided by the undesired signal and can be computed as a function of the gain and phase mismatch between the three channels. Channel 1 is the reference channel and the gain and phase mismatch parameters for channels 2 and 3 with respect to channel 1 are $\alpha_2$, $\alpha_3$, $\varphi_2$, and $\varphi_3$, respectively. The signals in the three channels can be written as a sum of the desired and undesired signals, e.g.:

$$Y_0 = e^{j\theta_1} + e^{j\theta_2} \quad (3)$$

$$Y_{60} = (1 + \alpha_2)e^{j(\theta_1 + \phi_2 + \pi/3)} + (1 + \alpha_2)e^{j(\theta_2 + \phi_2 - \frac{\pi}{3})},$$

$$Y_{120} = (1 + \alpha_3)e^{j(\theta_1 + \phi_3 + 2\pi/3)} + (1 + \alpha_3)e^{j(\theta_2 + \phi_3 - 2\pi/3)}$$

where $\theta_1$ and $\theta_2$ are arbitrary phases of the signal arriving from the two opposite beams in the three channels. After beamforming, beam 1 is analyzed without loss of generality, and the two components are:

$$B_1(1) = e^{j\theta_1} + (1 + \alpha_2)e^{j\phi_2}e^{j\theta_1} + (1 + \alpha_3)e^{j\phi_3}e^{j\theta_1} \text{ and} \quad (4)$$

$$B_1(2) = e^{j\theta_2} + (1 + \alpha_2)e^{j\phi_2}e^{j(\theta_2 - 2\pi/3)} + (1 + \alpha_3)e^{j\phi_3}e^{j(\theta_2 - \frac{4\pi}{3})},$$

where $B_1(1)$ is the desired signal arriving from the direction of beam 1 and $B_1(2)$ is the undesired signal arriving from the direction of beam 2, which is opposite to beam 1. The rejection ratio in dB can be approximated as:

$$R = \quad (5)$$
$$10 \log_{10}\left(\frac{\alpha_2^2 + \alpha_3^2 - \alpha_2\alpha_3 + \phi_2^2 + \phi_3^2 - \phi_2\phi_3 - \sqrt{3}\,\alpha_3\phi_2 + \sqrt{3}\,\alpha_2\phi_3}{9}\right).$$

Figure 9:
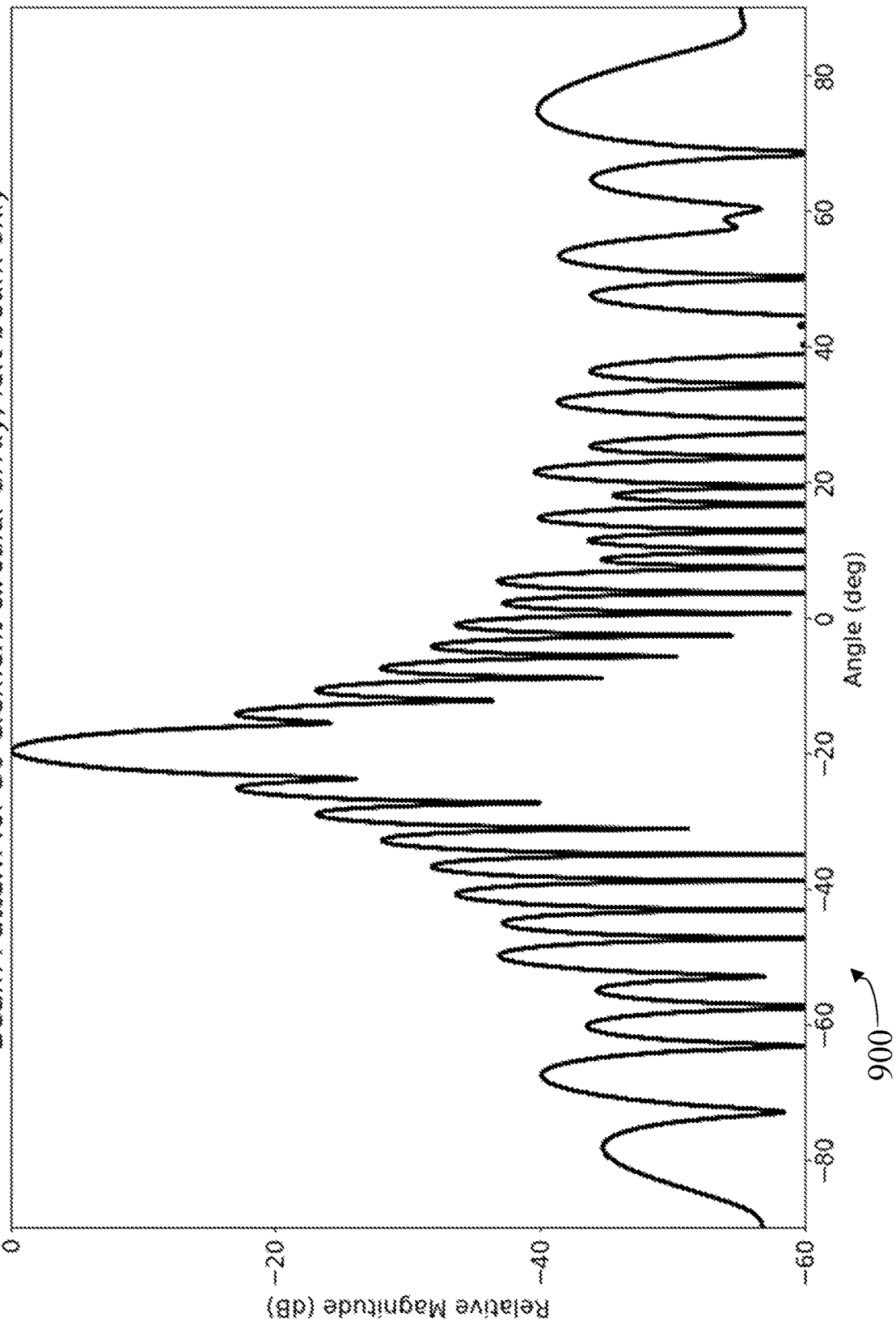
FIG. 9 is an example plot of a simulated transmit or receive beam pattern for a circular phased array employing an embodiment of the disclosed technology, forming a left beam of the two possible beams.
Figure 10:
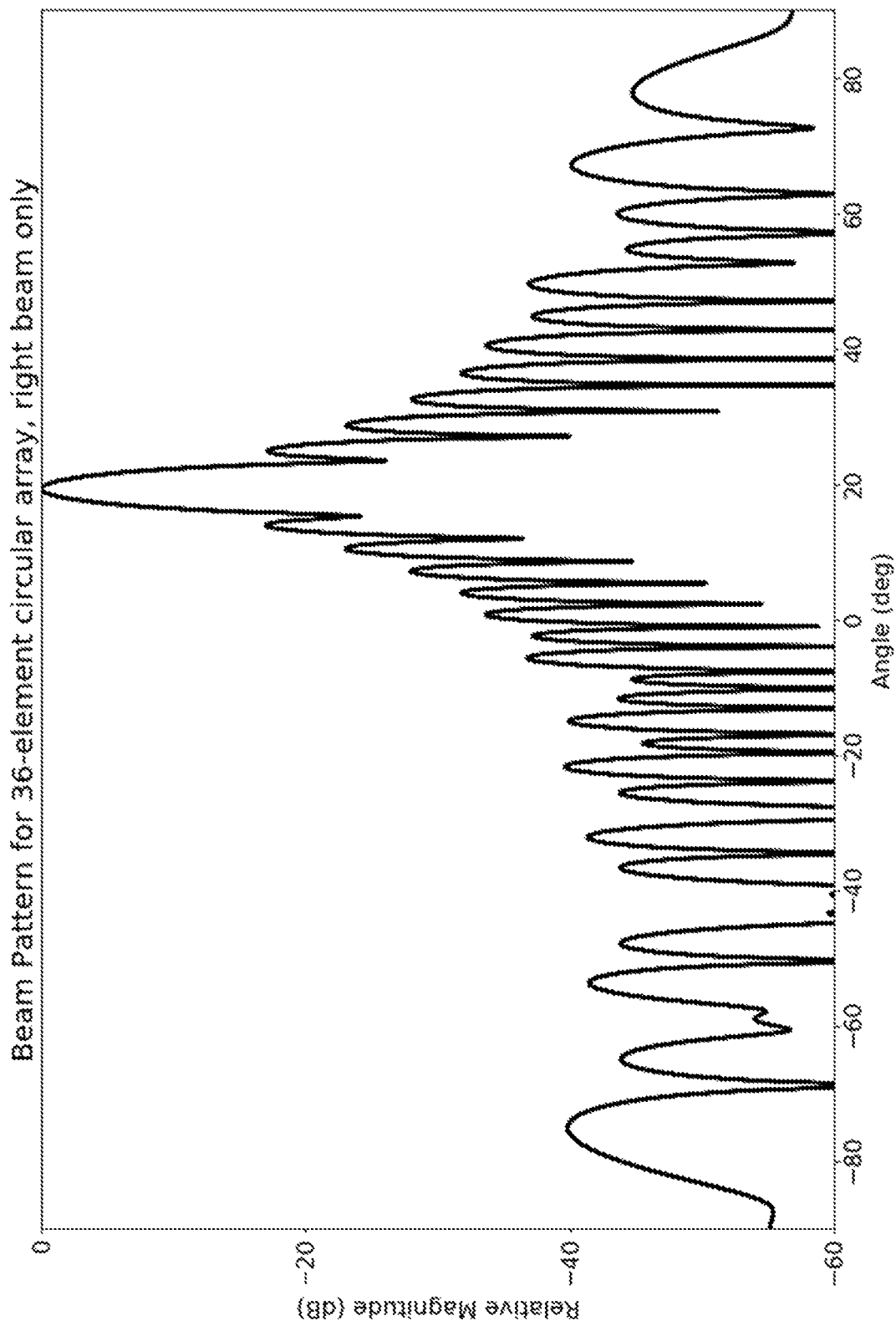
FIG. 10 an example plot of a simulated transmit or receive beam pattern for a circular phased array employing an embodiment of the disclosed technology, forming a right beam of the two possible beams.
Figure 11:
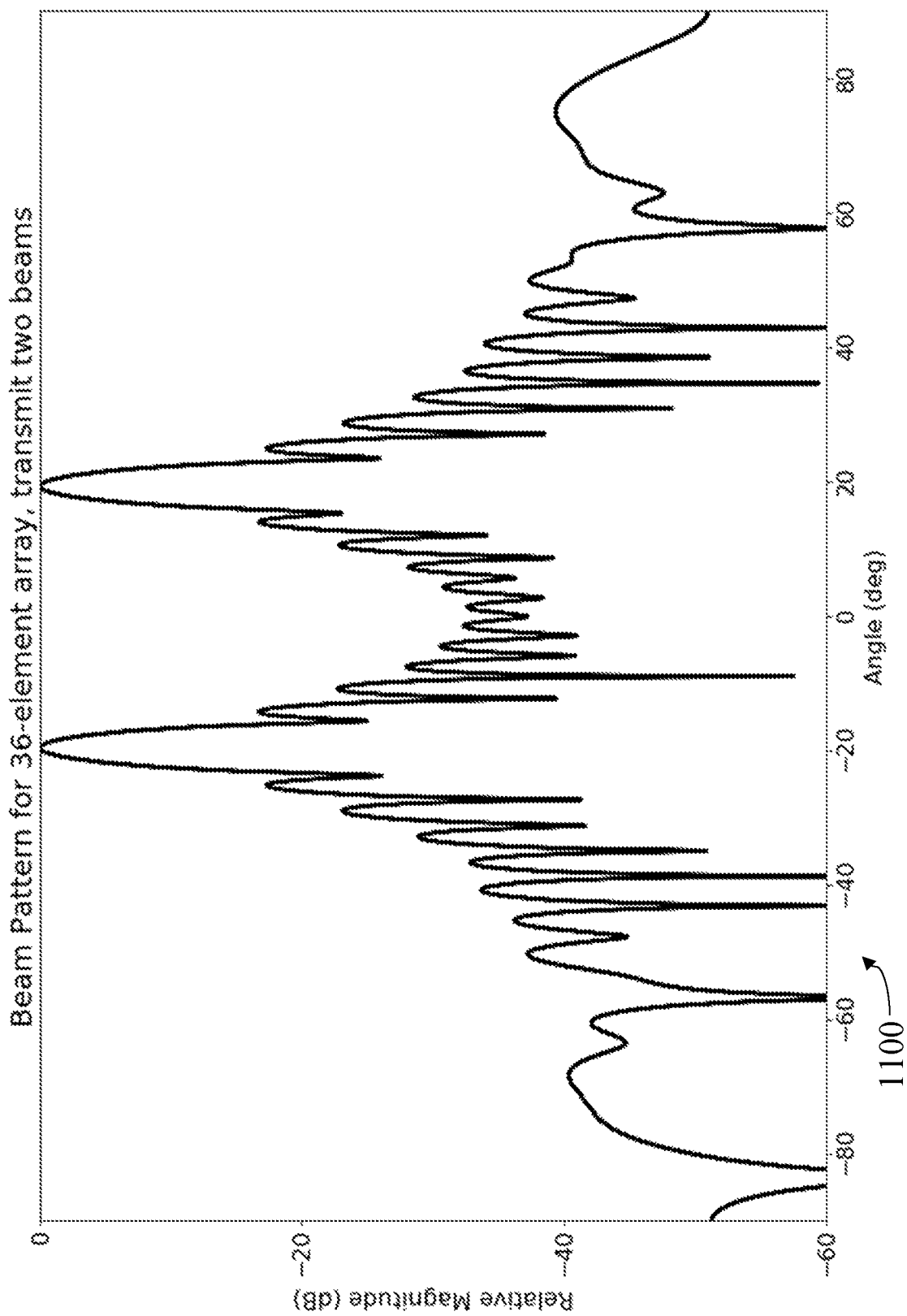
FIG. 11 an example plot of a simulated transmit beam pattern for a circular phased array employing an embodiment of the disclosed technology, simultaneously forming both possible beams for transmit.

FIG. 9, FIG. 10, and FIG. 11 illustrate the theoretical beam patterns for a circular phased array with a diameter of 36 elements, implemented using the disclosed technology. FIG. 9 and FIG. 10 show the beam pattern for a single transmit or receive beam using the disclosed technology where example beam pattern 900 is for a left beam and example beam pattern 1000 is for a right beam. FIG. 11 shows a beam pattern 1100 for a simultaneous pair of transmit beams.

The array of transducer elements can be constructed from individual, discrete transducer elements or by slicing a single transducer array into elements, as described in the existing technology.

Skilled technologists will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled technologists will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other suitable form of data storage medium now known or made available in the future. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, rather than sequentially.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

What is claimed is:

1. An acoustic transducer, comprising:
   a plurality of transducer elements arranged to form an array, wherein the elements are electrically connected into groups which operate at the same electrical phase, wherein the elements are electrically connected into rows in a first dimension and columns in a second dimension and the rows are electrically independent of the columns, wherein the phases of adjacent groups of elements differ by between 50 and 70 degrees; and
   a beamforming circuit wherein the transmit and receive signals are operated with appropriate phase shifts to maintain the between 50 and 70 degrees phase difference between adjacent groups, and the beamforming circuit is arranged to generate four acoustic beams simultaneously;
   wherein the resulting transducer generates transmit and receive beams that are nominally inclined at an angle in a range from 16 to 20 degrees from a planar normal axis of the array.

2. The acoustic transducer of claim 1, wherein the four acoustic beams generated by the transducer are in a Janus configuration.

3. The acoustic transducer of claim 1, wherein the transducer elements are arranged to form a single two-dimensional array.

4. The acoustic transducer of claim 1, wherein the transducer elements are arranged to substantially form a pattern selected from the group consisting of circular, elliptical and polygonal shapes.

5. The acoustic transducer of claim 1, wherein the transducer is used to measure the relative velocity between the transducer and acoustic scatterers in water.

6. The acoustic transducer of claim 1, wherein the dimension of the array elements is in a range from 0.34 to 0.6 wavelength at a nominal speed of sound in the vicinity of the transducer.

7. An acoustic transducer, comprising:
   a plurality of transducer elements of dimension between 0.34 and 0.60 wavelength at a nominal speed of sound, arranged to substantially form a pattern selected from the group consisting of circular, elliptical, or polygonal shapes;
   a first side of the transducer consisting of connections that connect rows of array elements together to form six groups, wherein each group is staggered by one row and is connected to every sixth row of the first side, and wherein the rows of the array elements are configured to form a first pair of orthogonal beams; and
   a second side of the transducer consisting of connections that connect columns of array elements together to form six groups, wherein each group is staggered by one column and is connected to every sixth column of the first side, and wherein the columns of the array elements are configured to form a second pair of orthogonal beams.

8. The acoustic transducer of claim 7, wherein the transducer elements are arranged to substantially form a circular pattern.

9. The acoustic transducer of claim 7, wherein the transducer is used to measure the relative velocity between the transducer and acoustic scatterers in water.

10. The acoustic transducer of claim 7, wherein transmit and receive beams are formed by applying phase shifts or time delays to the groups of signals.

11. A method of generating four acoustic transmit and receive beams in a Janus configuration with an elevation angle less than 30 degrees from an axis normal to an acoustic phased-array transducer, the method comprising:
    configuring an array of the transducer in a transmit mode;
    forming the transmit beams simultaneously by generating waveforms of appropriate relative phase relationship on six groups of array row connections and six groups of array column connections, wherein the transmit beams have the elevation angle less than 30 degrees from the axis normal to the acoustic phase-array transducer;
    configuring the array in a receive mode;
    applying relative phase shifts or time delays corresponding to a value between 50 and 70 degrees to at least one of six column connections or six row connections; and
    summing the signals for which the phase shifts were applied to form the four receive beams.

12. The method of claim 11, wherein relative velocity between the transducer and acoustic scatterers in water or boundary, including sea bottom, ice sheets, or surface, is measured.

13. The method of claim 11, wherein the received beams comprise a first pair of orthogonal beams formed using the array column connections and a second pair of orthogonal beams formed using the array row connections.

14. The method of claim 11, wherein elements of the transducer are arranged to substantially form a pattern selected from the group consisting of circular, elliptical and polygonal shapes.

15. A system for generating four acoustic transmit and receive beams in a Janus configuration with an elevation angle less than 30 degrees from an axis normal to an acoustic phased-array transducer, the system comprising:
    an array of the transducer configurable into a transmit mode and a receive mode;
    a transmit circuit configured to cause the transducer to form the transmit beams simultaneously by generating waveforms of appropriate relative phase relationship on six groups of array row connections and six groups of array column connections and to drive the transducer with the waveforms, wherein the elevation angle is less than 30 degrees from the axis normal to the acoustic phased-array transducer;

receive channels configured to apply relative phase shifts or time delays corresponding to a value between 50 and 70 degrees to either six column connections or six row connections, and to sum the signals for which the phase shifts were applied to form the four receive beams.

16. The system of claim 15, wherein the dimension of elements of the array is in a range from 0.34 to 0.6 wavelength at a nominal speed of sound.

17. The system of claim 15, wherein elements of the transducer are arranged to substantially form a pattern selected from the group consisting of circular, elliptical and polygonal shapes.

18. The system of claim 15, wherein the elevation angle is nominally 20 degrees.

19. The system of claim 15, wherein the relative phase shifts or time delays correspond to a value of 60 degrees.

20. The method of claim 11, wherein the elevation angle is in a range from 16 to 20 degrees from the axis normal to the acoustic phase-array transducer.

21. The acoustic transducer of claim 1, wherein:
the groups comprise six groups;
the phase difference between adjacent groups of elements differs by 60 degrees; and
the six groups span a range of 360 degrees.

* * * * *